United States Patent
Oka et al.

(10) Patent No.: US 6,263,271 B1
(45) Date of Patent: Jul. 17, 2001

(54) PASSENGER DETECTION SYSTEM COMPRISING SIDE AIRBAG WHICH IS DEPLOYABLE OR NON-DEPLOYABLE ACCORDING TO SEATING CONDITION

(75) Inventors: Yoshitaka Oka, Osaka; Tsutomu Fukui, Wako; Nobuhiro Koyota, Wako; Takashi Inou, Wako; Kazutomo Isonaga, Wako, all of (JP)

(73) Assignees: NEC Corporation; Honda Giken Kogyo Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/394,005

(22) Filed: Sep. 10, 1999

(30) Foreign Application Priority Data

Sep. 10, 1998 (JP) .................................. 10-257122

(51) Int. Cl.[7] .................................. B60R 21/22
(52) U.S. Cl. .................. 701/45; 307/9.1; 280/730.2; 280/735
(58) Field of Search .................. 701/45, 46, 47; 307/9.1, 10.1; 280/730.1, 730.2, 734, 735, 733; 180/268, 271, 272, 273

(56) References Cited

U.S. PATENT DOCUMENTS

| | | | |
|---|---|---|---|
| 5,464,246 | * 11/1995 | Castro et al. | 280/730.2 |
| 5,524,924 | * 6/1996 | Steffens, Jr. et al. | 280/730.2 |
| 5,525,843 | 6/1996 | Höwing | 307/9.1 |
| 5,948,031 | * 9/1999 | Jinno et al. | 701/45 |
| 6,018,693 | * 1/2000 | Blackburn et al. | 701/45 |
| 6,126,194 | * 10/2000 | Yaniv et al. | 280/733 |
| 6,179,326 | * 1/2001 | Breed et al. | 280/735 |

FOREIGN PATENT DOCUMENTS

| | | |
|---|---|---|
| 6-065532 | 8/1994 | (JP) . |
| 9-509118 | 9/1997 | (JP) . |

* cited by examiner

*Primary Examiner*—Gary Chin
(74) *Attorney, Agent, or Firm*—Foley & Lardner

(57) ABSTRACT

A passenger detection system for precisely detecting the sitting condition of a passenger occupying a seat, who leans against the seat supporting section, and for suitably controlling the deployment/non-deployment of the side airbag based on the results of the detection process. The system comprises a seat having a seat supporting section in which an antenna electrode is provided; a voltage generation device for generating a high-frequency and low-voltage signal which induces a weak electric field around the antenna electrode; a current detection section for detecting a current which flows according to the generated weak electric field; and a control circuit for detecting a leaning condition of the passenger against the seat supporting section, based on a signal output from the current detection section; and an airbag apparatus including a side airbag unit positioned close to a door, the apparatus having a function of deploying the side airbag unit when a collision occurs. Data representing results detected by the control circuit is sent to the airbag apparatus so as to set the side airbag unit to one of the deployable and non-deployable states.

4 Claims, 11 Drawing Sheets

PASSENGER DETECTION SYSTEM COMPRISING SIDE AIRBAG WHICH IS DEPLOYABLE OR NON-DEPLOYABLE ACCORDING TO SEATING CONDITION

BACKGROUND OF THE INVENTION

1. Field of the Invention

The present invention relates to a passenger detection system, and relates in particular to an improved passenger detection system that places the side airbag for the passenger, in the deployable or non-deployable state, depending on the seating conditions of the passenger (here, the term passenger also includes the driver) sitting in the driver's seat or front passenger's seat in an automobile.

This application is based on Patent Application No. Hei 10-257122, filed in Japan, the contents of which are incorporated herein by reference.

2. Description of the Related Art

In general, an airbag apparatus in an automobile is aimed at protecting passenger(s) in the automobile from shocks, in the event of a collision, and is now considered to be an essential item for automotive safety, and in recent years, airbags have been provided for the front passenger's seat as well as for the driver's seat.

An example of such an airbag apparatus is shown in FIG. 12, and is comprised by: a driver-side squib circuit comprised by a series circuit including safety sensor SS1, squib SQ1, and a semiconductor switching device SW1 such as a field effect transistor; a front-passenger-side squib circuit comprised by a safety sensor SS2, a squib SQ2, and a semiconductor switching device SW2 such as a field effect transistor; an electronic accelerometer (impact sensor) GS; and a control circuit CC for judging presence/absence of an impact on the basis of output signals from the sensor GS, and supplying signals to the gate circuits of the switching devices SW1, SW2.

In this air bag apparatus, when a (substantial) head-on collision occurs for whatever reason, safety sensors SS1 and SS2 are closed responding to a relatively minor acceleration, and the squib circuits are placed in an operable state. And, when the control circuit CC judges that a collision has definitely taken place according to the signals from the accelerometer GS, signals are sent to the gates of switches SW1, SW2 and the switches SW1, SW2 are closed. As a result of a current flowing in the respective squib circuits, the driver-side and passenger-side airbags are immediately deployed because of the heating in the squibs SQ1 and SQ2, and the occupants are protected from the collision impact.

There are the following types of automobile collision: the first type in which both automobiles crash into each other head-on, the second type in which one automobile crashes into the side of another automobile, the third type in which one automobile crashes into the back of another automobile, and the like. Recently, an airbag apparatus as shown in FIG. 13 has been proposed for protecting passengers in the above second mode.

This airbag apparatus is made by adding a side airbag (apparatus) SA to the airbag apparatus shown in FIG. 12, and the basic structure of the airbag apparatus of FIG. 13 is the same as that of the airbag apparatus of FIG. 12.

That is, the side airbag apparatus SA is comprised by: a driver-side squib circuit comprised by a series circuit including safety sensor SS3, squib SQ3, and a semiconductor switching device SW3 such as a field effect transistor; and a front-passenger-side squib circuit comprised by a safety sensor SS4, a squib SQ4, and a semiconductor switching device SW4 such as a field effect transistor. The side airbag is typically placed at the door side near the driver's or front passenger's seat, or a side facing the door of the relevant seat.

According to the above airbag apparatus, when another automobile crashes (by any reason) into a door close to the driver's or front passenger's seat of the automobile, safety sensor SS3 or SS4 is closed responding to a relatively minor acceleration, and the squib circuit at the driver's or front passenger's seat is placed in an operable state. And, when the control circuit CC judges that a collision has definitely taken place according to the signals from the accelerometer GS, a signal is sent to the gate of switching device SW3 or SW4 and the switching device SW3 or SW4 is closed. As a result of a current flowing in one of the respective squib circuits, the side airbag at the driver's side or front passenger's side is immediately deployed because of the heating in the squib SQ3 or SQ4, and the relevant occupant is protected from the collision impact caused by a flank collision.

Here, the seating conditions of the passengers are various, and FIG. 14 shows examples thereof. In FIG. 14, seat 1 has sitting section 1a, backrest section 1b, and seat supporting section 1c. A passenger can be seated in any condition as shown using solid lines or dotted lines, or the condition may change from the first state as shown by the solid lines to the second state as shown by the dotted lines.

When a passenger P is seated at the center of seat 1 as shown by the solid lines in FIG. 14, even if a collision occurs against a side of the automobile, the deployment of the side airbag protects the passenger P from the shock caused by the collision. However, when the passenger P is seated on seat 1 leaning against the seat supporting section 1c at the door Dr side as shown by the dotted lines, even if a collision occurs against a side of the automobile, non-deployment of the side airbag may be very desirable.

SUMMARY OF THE INVENTION

In consideration of the above circumstances, an objective of the present invention is to provide a passenger detection system for precisely detecting the sitting condition of a passenger occupying a seat, and who leans against the seat supporting section, and for suitably controlling the deployment/non-deployment of the side airbag based on the results of the detection process.

Therefore, the present invention provides a passenger detection system, comprising:

- a seat on which a passenger is seated, having a seat supporting section;
- an antenna electrode provided in the seat supporting section;
- voltage generation means for generating a high-frequency and low-voltage signal which induces a weak electric field around the antenna electrode;
- current detection means for detecting a current which flows according to the generated weak electric field;
- a control circuit for detecting a leaning condition of the passenger against the seat supporting section, based on a signal output from the current detection means; and
- an airbag apparatus including a side airbag unit positioned close to a door, the apparatus having a function of deploying the side airbag unit when a collision occurs, and
- wherein data representing results detected by the control circuit is sent to the airbag apparatus so as to set the side airbag unit to one of the deployable and non-deployable states.

Accordingly, a current corresponding to the leaning condition of the passenger against the seat supporting section flows in the antenna electrode. For example, when the passenger leans against the seat supporting section, the current level is higher, while when the passenger is not in contact with the seat supporting section, the current level is lower. Therefore, the suitability of the leaning condition of the passenger against the seat supporting section can be simply and easily detected based on the current level.

In addition, the side airbag unit of the airbag apparatus is set to one of the deployable and non-deployable states, based on the seating (i.e., leaning) condition of the passenger seated on the seat. Typically, if it is determined that the passenger leans against the seat supporting section heavily, the side airbag unit of the airbag apparatus is set to the non-deployable state. Therefore, even if an automobile crashes into the relevant side of the automobile having this passenger detection system, the side airbag unit does not deploy; thus, much more suitable control of the side airbag can be performed in consideration of the safety of the passenger.

The voltage generation means may comprise an oscillator for generating the high-frequency and low-voltage signal.

In addition, the voltage generation means may generate a high-frequency and low-voltage signal having an approximately rectangular waveform by only using a positive power source and a signal from the control circuit.

Typically, the control circuit judges the suitability of the leaning condition of the passenger against the seat supporting section by comparing threshold value data, stored in advance in the control circuit, of an allowable limit with respect to the above leaning condition, with data representing the actual leaning state of the passenger against the seat supporting section obtained according to the current detected by the current detection means.

BRIEF DESCRIPTION OF THE DRAWINGS

FIG. 1A shows the distribution of an electric field around an antenna electrode, while FIG. 1B shows the distribution of an electric field when an object exists in the vicinity of an antenna electrode.

FIG. 2A is a side view showing antenna electrodes provided in the seat, while FIG. 2B is a front view of the system shown in FIG. 2A.

FIG. 3A is a plan view while FIG. 3B is a cross-sectional view corresponding to FIG. 3A.

DESCRIPTION OF THE PREFERRED EMBODIMENTS

The basic principle of the passenger detection system according to the present invention will be explained with reference to FIGS. 1A and 1B. The present detection system is based on perturbations in a weak electric field generated by the presence of an object in the vicinity of an antenna electrode.

Figure 1A:
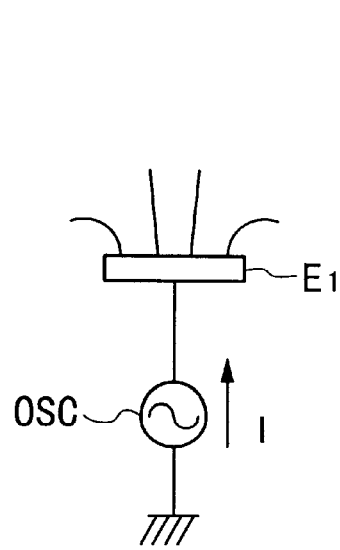
FIGS. 1A and 1B are diagrams for explaining the basic operations related to the passenger detection system according to the present invention.
Figure 1B:
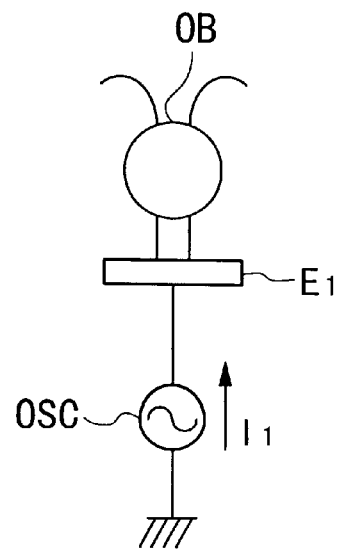

First, as shown in FIG. 1A, when a high frequency low voltage (HFLV) signal is applied to an antenna electrode E1 by an oscillation circuit OSC, a weak electric field is generated in the vicinity of the electrode, resulting in a flow of (transmission) current I in the antenna electrode E1. When an object OB is introduced in the vicinity of the antenna electrode E1, as shown in FIG. 1B, the electric field is disturbed, resulting in generation of current $I_1$ at the antenna electrode E1 side, which is different in character than current I.

Therefore, by utilizing the fact that the different currents flow in antenna electrode E1, depending on presence/absence of object OB on a seat of the automobile, it is possible to detect the seating condition of the passenger. More specifically, by increasing the number of antenna electrodes, much more precise information can be gained on the object, including a passenger, that occupies the seat so that the condition of the passenger can be much more precisely detected.

Figure 2A:
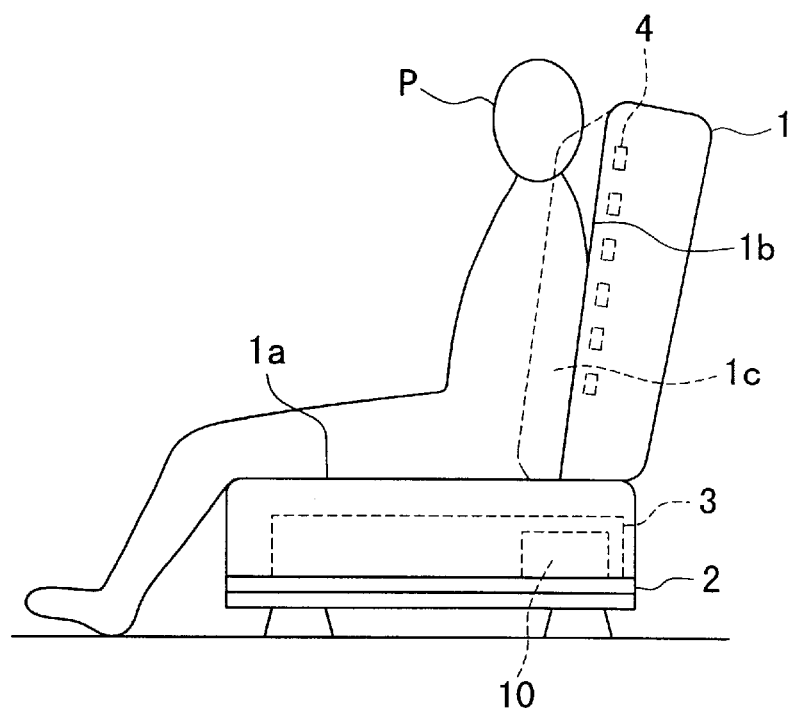
FIGS. 2A and 2B are diagrams showing the passenger detection system installed in an automobile.
Figure 2B:
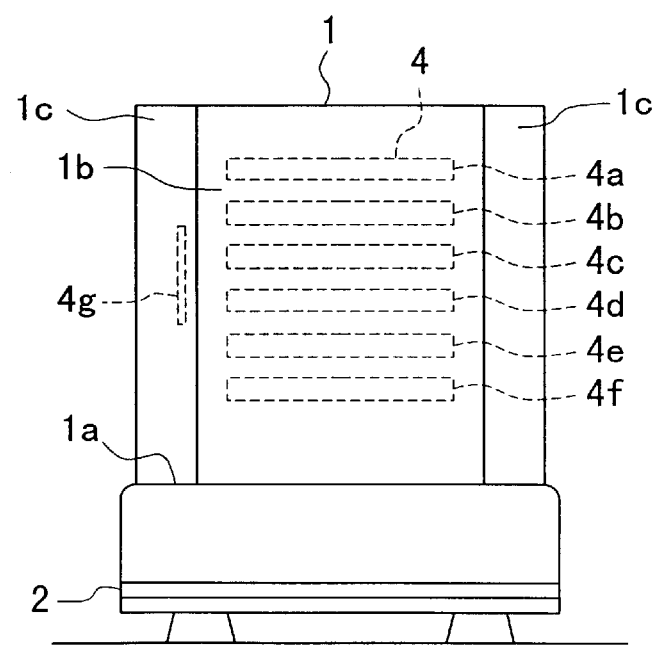
Figure 12:
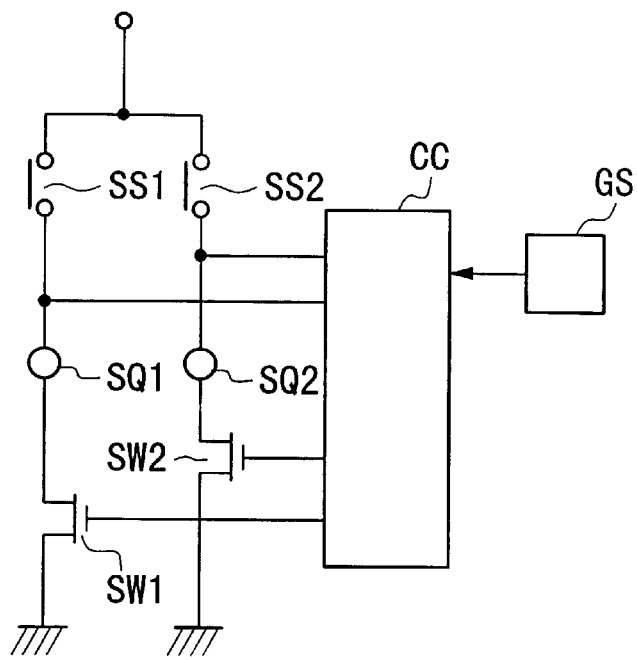
FIG. 12 is the circuit diagram of an airbag apparatus in a conventional example.
Figure 14:
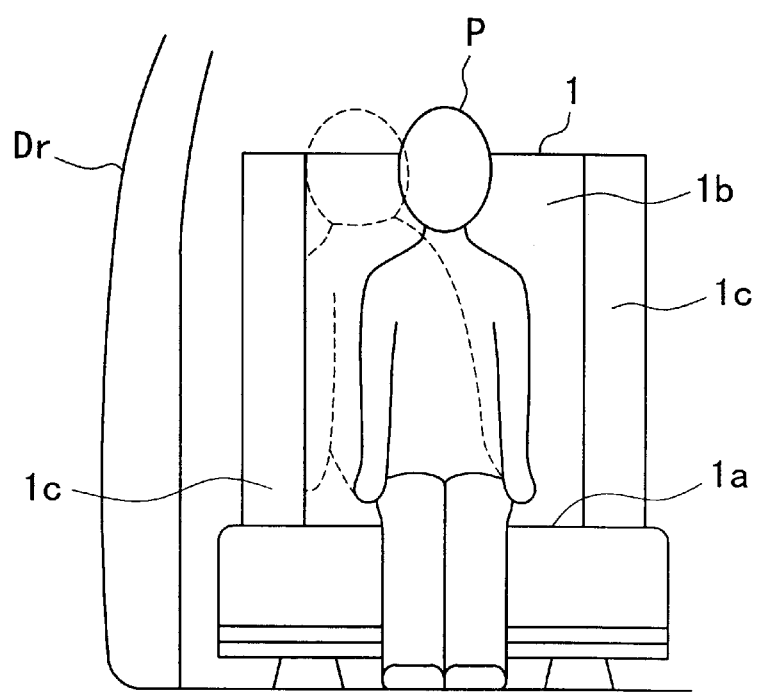
FIG. 14 is a diagram explaining the seating condition of a passenger seated on the seat.
Figure 13:
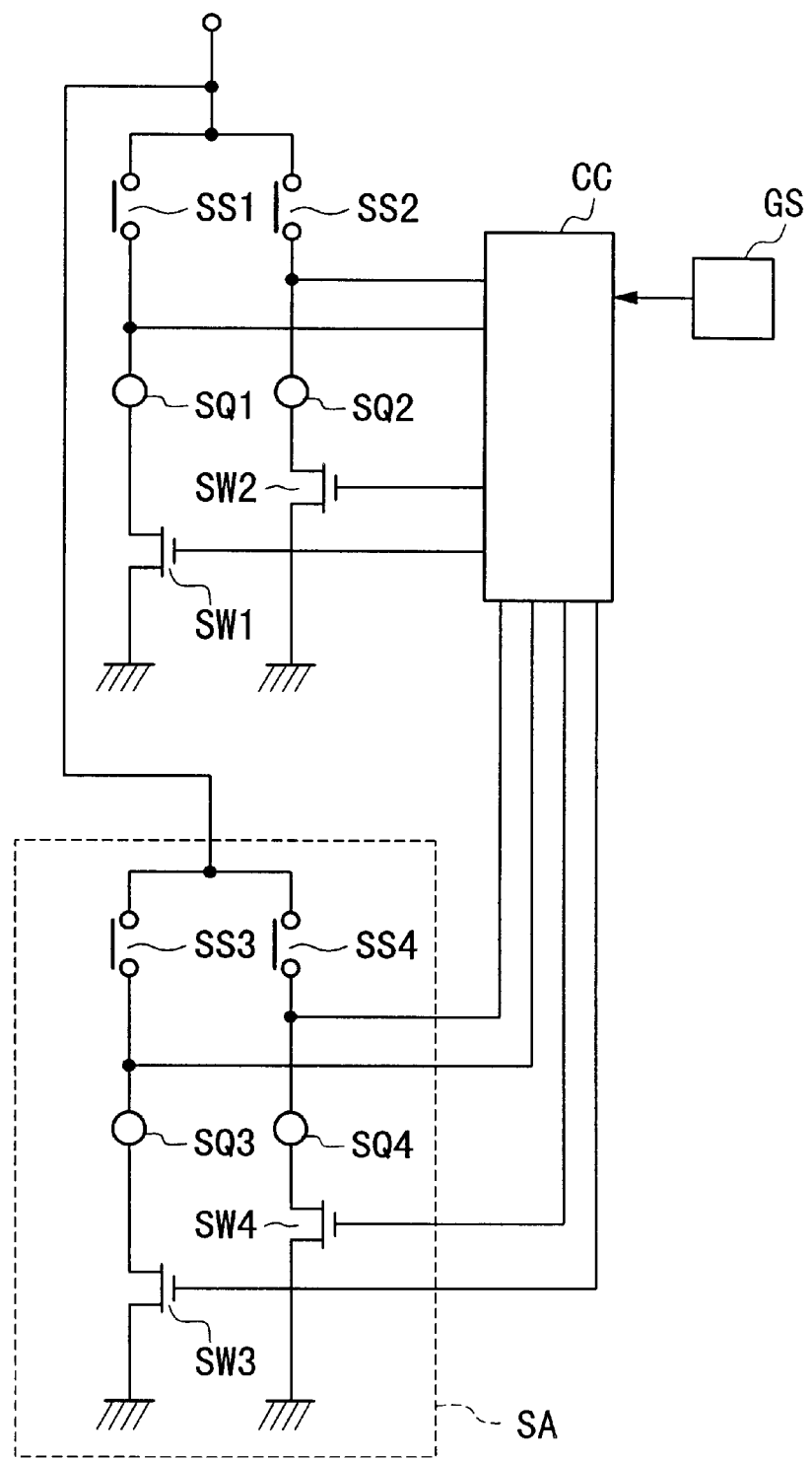
FIG. 13 is the circuit diagram of an improved airbag apparatus in a conventional example.

Next, the passenger detection system according to the present invention, based on the above principle, will be explained with reference to FIGS. 2A, 2B, to 5. The parts of the present system which are the same as those in the conventional systems shown in FIGS. 12 to 14 are referenced using the same reference numerals and their detailed explanations are omitted.

FIGS. 2A, 2B, 3A, and 3B show the structures of the driver's or front passenger's seat 1, which is comprised primarily of sitting section 1a, backrest section 1b, and seat supporting section 1c.

The sitting section 1a is typically comprised by a seat frame 3 fixed to a base 2 that is slidable forward and backward, a cushion part disposed above the seat frame 3, and an outer covering for the cushion part. The backrest section 1b is typically comprised by a cushion part disposed on the front side of the seat frame 3 and an outer covering for the cushion part.

This backrest section 1b has a plurality of strip antenna electrodes 4 (4a4b, . . . 4f) arranged in the substantially horizontal direction and having spacing between each two electrodes. These antenna electrodes are long enough to occupy a wide area in the cross direction of the backrest section 1b. Typically, the seat supporting section 1c at the door side has a strip antenna electrode 4g arranged in the vertical direction.

It is possible to install the antenna electrodes 4 on the outside or inside of the covering or on the covering part itself. Also, a plurality of antenna electrodes 4g may be provided, or the above antenna electrode 4g may be divided into elements in the vertical direction in the seat supporting section 1c. Furthermore, control unit 10 (explained later) is provided on the seat frame 3 and in the vicinity thereof (for example, the inside of the backrest section 1b).

The antenna electrodes 4 are made of a conductive fabric or the like, but they may be made by weaving a metallic thread in the seat fabric of the backrest section 1b and seat supporting section 1c or applying a conductive paint or using metal strips in the seat fabric.

Figure 3A:
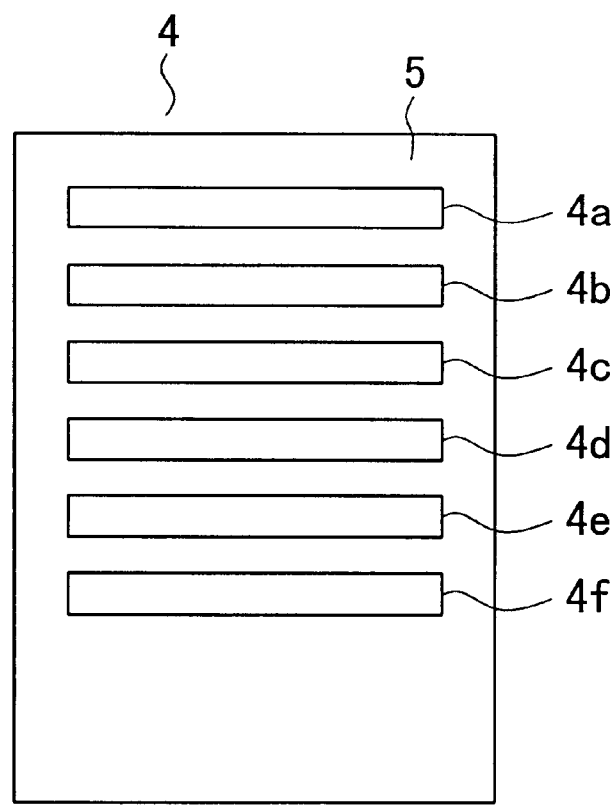
FIGS. 3A and 3B are diagrams showing actual structures of the antenna electrode shown in FIGS. 2A and 2B.
Figure 3B:
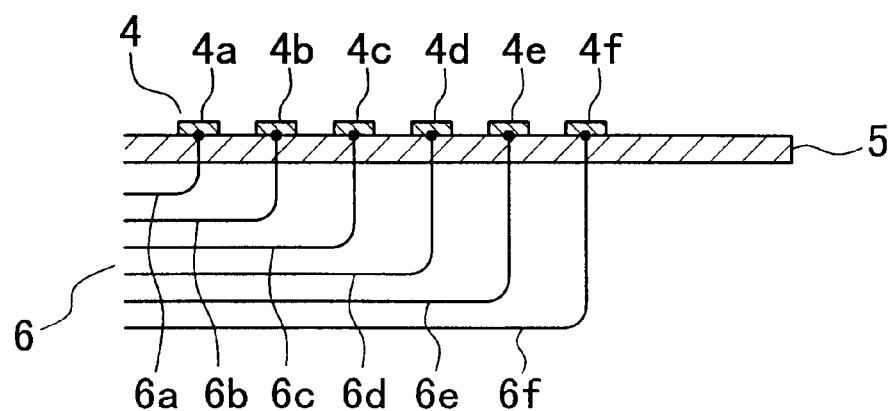

The strip antenna electrodes 4a, 4b, . . . , 4f have the same size (e.g., width: 30 mm, length: 280 mm). As shown in FIGS. 3A and 3B, it is preferable that the antenna electrodes 4a, 4b, . . . , 4f be constructed by arranging these separate strip electrodes as a unit on one surface of a base member 5 made of an insulating material, having specified spacing (e.g., 10 mm) between the electrodes in the vertical direction. This unit is placed inside of the outer covering part of the backrest section 1b.

The size of the antenna electrode 4g is smaller than that of the antenna electrodes 4a, 4b, . . . , 4f and is positioned at one of the sides of the seat supporting section 1c, which face inward towards each other. Lead wires 6 (i.e., 6a, 6b, . . . , 6g) are respectively connected to the antenna electrodes 4a4b, . . . , 4f and 4g. These lead wires are respectively connected to connectors (or terminals) 19a, 19b, . . . , 19g of the control unit 10 explained later.

Figure 4:
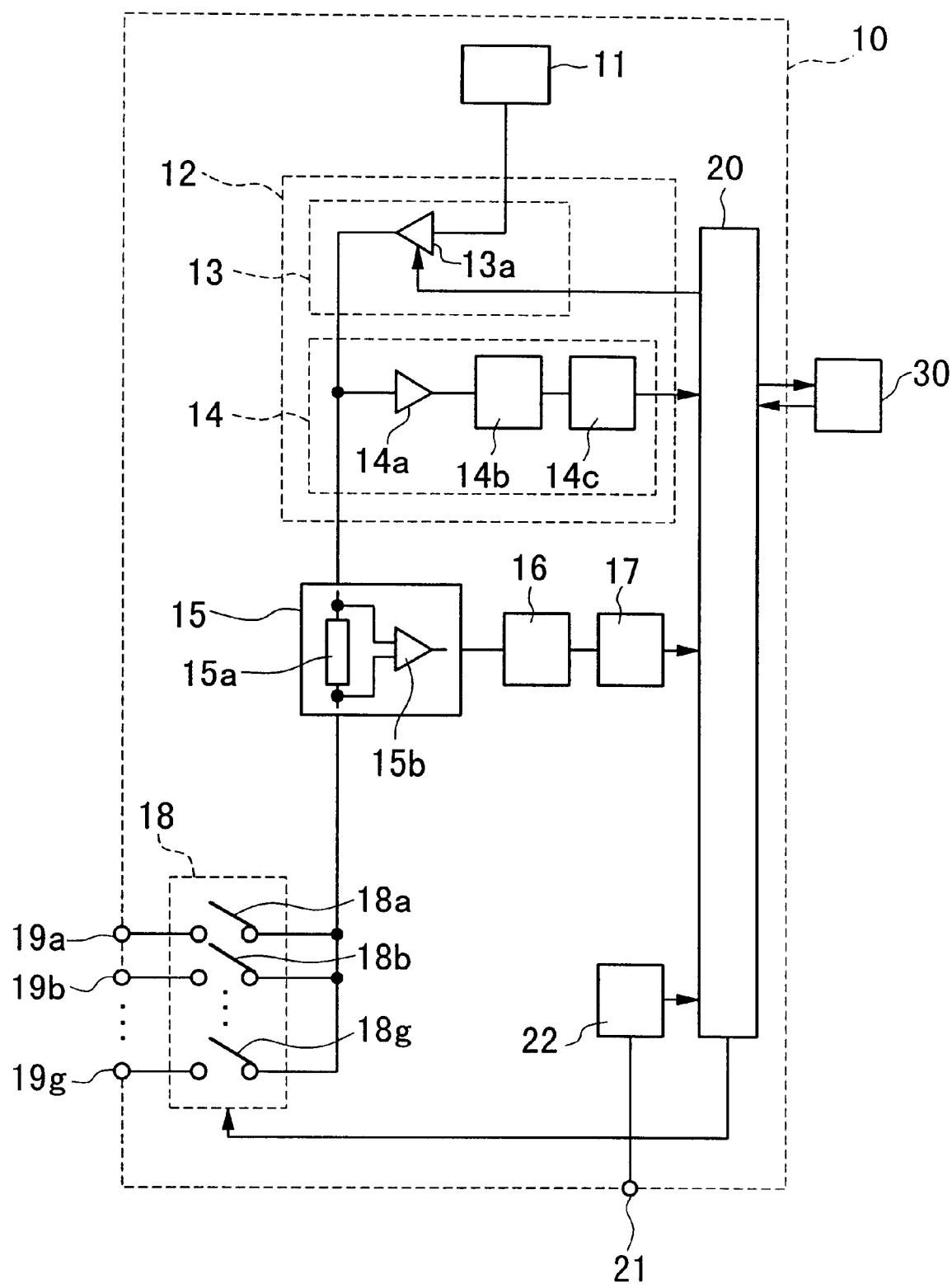
FIG. 4 is the circuit diagram of an embodiment of the passenger detection system according to the present invention.

As shown in FIG. 4, the control unit 10, attached to seat 1, is comprised by: an oscillation circuit (corresponding to the voltage generation means of the present invention) 11 for generating a high-frequency (e.g., about 120 kHz) and low-voltage (e.g., about 5 to 12 V) signal; an amplitude control circuit 12 for controlling the amplitude of the transmission signal output from the oscillation circuit 11 to be approximately constant; a current detection circuit 15 (corresponding to the current detection means of the present invention) for detecting the current of the transmission signal; an AC-DC conversion circuit 16 for converting the output signal from the current detection circuit 15 to direct current; an amplifier 17 for amplifying the output signal from the AC-DC conversion circuit 16; a switching circuit 18, having a plurality of switching devices 18a, 18b, . . . , 18g for the antenna electrodes 4a4b, . . . , and 4g connected to the current detection circuit 15; connectors 19a, 19b, . . . , and 19g disposed the housing of the control unit and connected to the switching devices 18a, 18b, . . . , and 18g of the switching circuit 18; a control circuit 20 including a MPU and the like; a connector 21 disposed in the housing and connected to a battery source (not shown); and a power supply circuit 22 inserted between the connector 21 and the control circuit 20. Here, the selecting operation between the switching devices 18a, 18b, . . . , and 18g of the switching circuit 18 is performed according to the signal from the control circuit 20.

Figure 5:
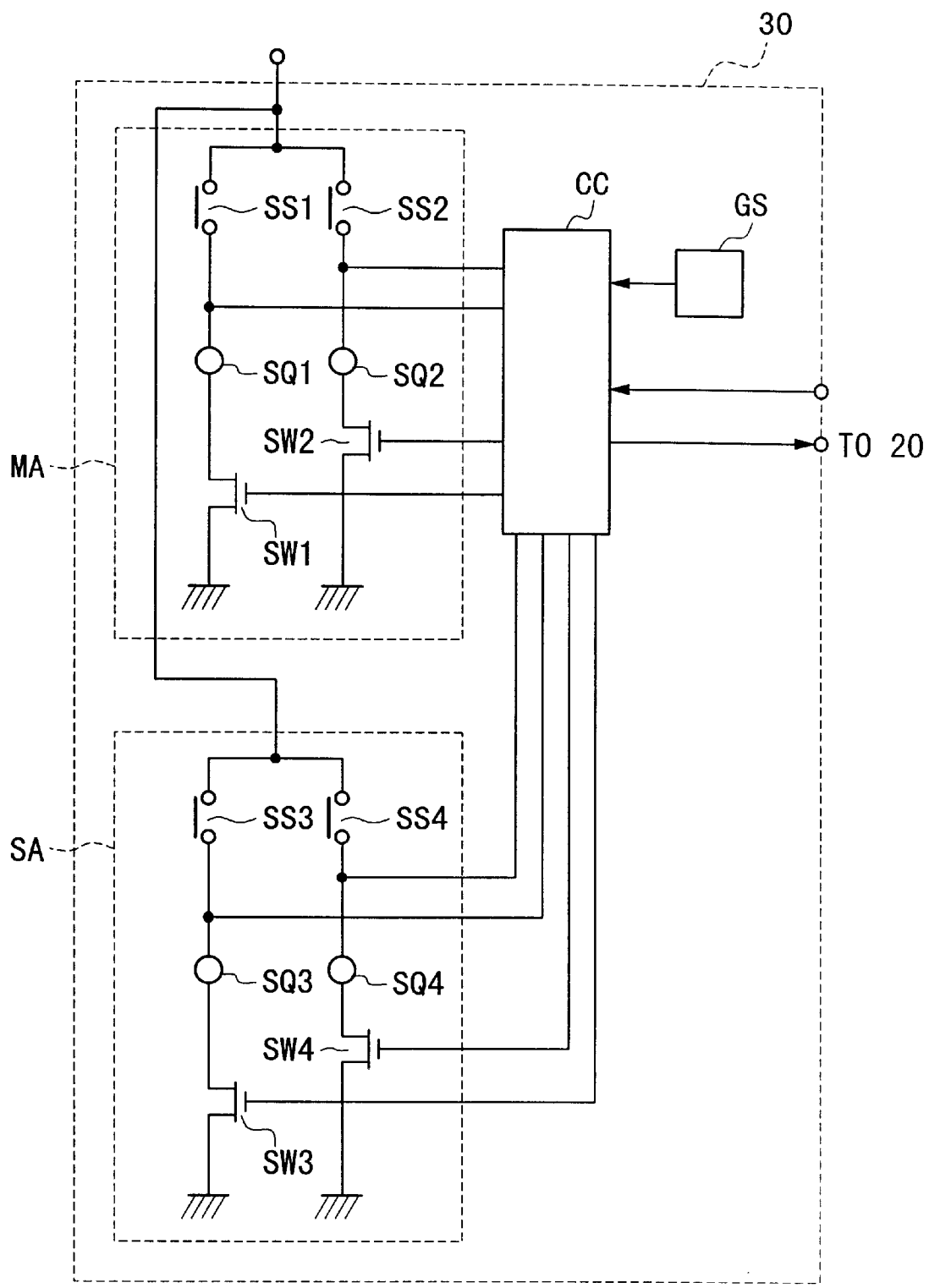
FIG. 5 is the circuit diagram of the airbag apparatus shown in FIG. 4.

An airbag apparatus 30 having the structure as shown in FIG. 5 is connected with the control circuit 20 of the above control unit 10. This airbag apparatus 30 comprises main airbag unit MA typically positioned in front of the driver's and front passenger's seats, side airbag unit SA typically positioned at the door side of the driver's and front passenger's seats, control circuit CC, and electronic accelerometer (impact sensor) GS. Here, the side airbag unit SA may be provided for any one of the driver's and front passenger's seats.

In this control unit 10, amplitude control circuit 12 typically comprises amplitude varying circuit 13 for varying the voltage amplitude of transmission signals and amplitude detection circuit 14 for detecting the voltage amplitude of the transmission signals.

The amplitude varying circuit 13 typically has amplitude varying section 13a including a programmable gain amplifier (PGA), while the amplitude detection circuit 14 typically has voltage amplitude detecting section 14a including an operational amplifier and others, AC-DC conversion circuit 14b for converting the output signal from the amplitude detection circuit 14a to direct current, and amplifier 14c for amplifying the output signal from the AC-DC conversion circuit 14b. Here, the output signal from the amplifier 14c is supplied to the control circuit 20, and the amplitude varying signal for the amplitude varying section 13a is output from the control circuit 20.

The current detection circuit 15 in the control unit 10 typically includes an impedance element, for example resistor 15a, connected in series to the signal circuit (i.e., transmission signal side) and an amplifier 15b, such as a differential amplifier, for amplifying the terminal voltage of the resistor 15a. The output side of the current detection circuit 15 is connected to the control circuit 20 through the AC-DC conversion circuit 16 and the amplifier 17. The output side of the resistor 15a in the current detection circuit 15 is connected to the connectors 19a, 19b, . . . , 19g through the switching circuit 18.

The passenger detection system having the above structure operates in the following manner. First, the oscillation circuit 11 generates an HFLV signal whose voltage amplitude is detected by the detection section 14a of the amplitude detection circuit 14, and the detection signal is converted to a DC signal in the AC-DC conversion circuit 14b. The converted signal is then amplified in the amplifier 14c, and the amplified signal is input in the control circuit 20.

The control circuit 20 judges whether the detected voltage amplitude meets the required amplitude value, and sends an amplitude varying signal to the amplitude varying section 13a so as to correct the amplitude to the required value. This process controls the voltage amplitude of the transmission signal at a specific voltage amplitude, and henceforth, voltage amplitude of the transmission signal is corrected to the specific voltage amplitude by the linked action of the amplitude varying circuit 13 and the amplitude detection circuit 14.

The transmission signal having a constant voltage amplitude in the above way is applied to antenna electrodes 4 through the current detection circuit 15, switching circuit 18, and the connectors, resulting in the generation of a weak electric field in the vicinity of the antenna electrodes 4. In this process, switching circuits 18 are operated by signals from the control circuit 20 so that, first, only the switching device 18a is closed, next only the switching device 18b is closed, next only the switching circuit 18c is closed, and such a stepwise switching is successively carried out so that when a particular switch is being closed, the other switches are all opened.

Therefore, when a particular switching device of the switching devices (18a~18g) is closed, the constant-amplitude transmission signal passes through current detection circuit 15, the particular switching device (one of 18a to 18g), a particular connector (one of 19a to 19g corresponding to the particular switching device), and reaches a particular antenna electrode (one of 4a to 4g corresponding to the particular switching device), generating a weak electric field in the vicinity of the particular antenna electrode (one of 4a to 4g), so that a specific value of current, governed by the seating condition of passenger P seated on seat 1, flows in the relevant antenna electrode. That is, the current corresponds to the dielectric constant of the relevant body part of the passenger, such as the back, the shoulder, the neck, or the head, and to the distance between the passenger and the seat supporting section 1c. The above current is detected by the current detection circuit 15, converted to a DC signal in the AC-DC conversion circuit 16, amplified in the amplifying circuit 17 and is successively input in the control circuit 20. Here, the sequence of switching may be in a reverse direction, 18g, 18f, . . . to 18a.

In the control circuit 20, reference data are already stored such as threshold value (data) regarding the head position of passenger P who is seated on seat 1, and another threshold value (data) regarding distance conditions of passenger P with respect to the seat supporting section 1c, that is, how close the passenger is to antenna electrode 4g.

Specifically, the threshold value data regarding the head position are selected as follows. If an adult or child passenger is seated on the seat 1, the transmission current level to each antenna electrode is specified depending on the dielectric constant of the relevant body part of the passenger, such as the head, the neck, the shoulder, or the back, that is, a portion below the shoulder generates the highest level, the head generates the second highest level, while the neck generates the lowest level. Therefore, using the level difference of the transmission current between the shoulder and the neck, the shoulder line of the passenger can be detected. In this case, the upper part above the shoulder line can be determined as the head part; thus, the threshold value regarding the head position is determined at the center position (i.e., height) between the position (i.e., height) of the antenna electrode which faces the shoulder of an adult and the position (i.e., height) of the antenna electrode which faces the shoulder of a child.

Figure 6:
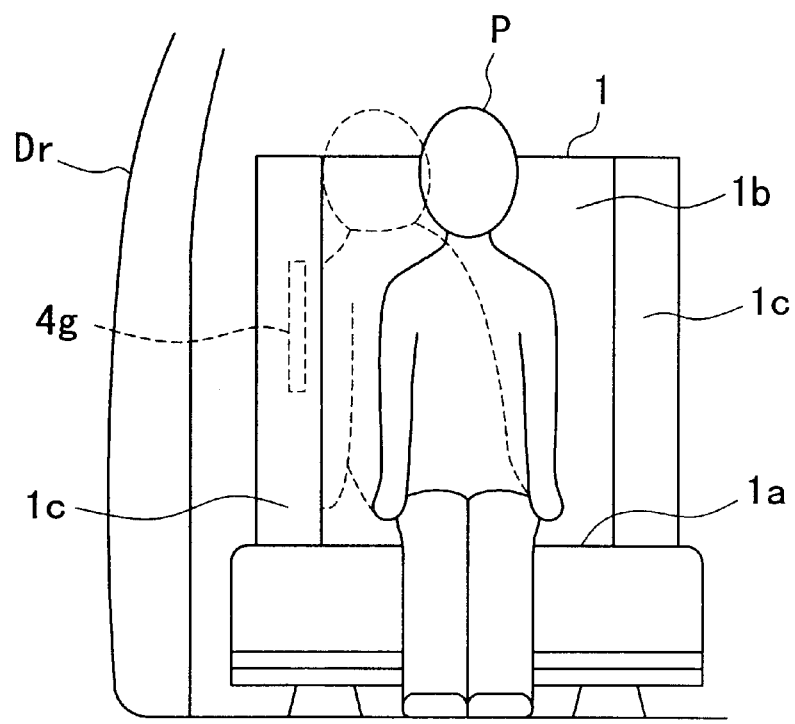
FIG. 6 is a diagram for explaining the seating condition of a passenger seated on the seat.

On the other hand, the threshold value regarding the distance conditions of passenger P to antenna electrode 4g can be determined with reference to the seating condition of passenger P as shown using dotted lines in FIG. 6, observed when the passenger leans on the seat supporting section 1c. Such a seating condition is the worst or most limiting condition for deploying the side airbag. Additionally, the threshold value is determined based on data corresponding to the current flowing through antenna electrode 4g in the above seating condition.

That is, if actual data corresponding to the current flowing through antenna electrode 4g is equal to or grater than the threshold value, it is judged that the passenger P leans against the seat supporting section 1c, as shown by using the dotted lines in FIG. 6. On the contrary, if the data is smaller than the threshold value, it is judged that the passenger P is seated in the normal posture, as shown by using the solid lines in FIG. 6.

Thus, signal data (here, head position data) received by the control circuit 20 are compared with the threshold data (regarding the head position) stored in advance in the control circuit 20, so that it is determined whether seat 1 has an adult passenger. According to the determined result, the main airbag unit MA in the airbag apparatus 30 in FIG. 5 is placed in the deployable or non-deployable state by the transmission signal from control circuit 20.

On the other hand, signal data regarding the leaning condition on the seat supporting section 1c, also received by the control circuit 20, are compared with the threshold data (regarding the leaning condition) stored in advance in the control circuit 20, so that it is determined whether the passenger leans against the seat supporting section 1c. According to the determined result, the side airbag unit SA in the airbag apparatus 30 is placed in the deployable or non-deployable state by the transmission signal from control circuit 20.

That is, the transmission signal from the control circuit 20 is input in the control circuit CC of the airbag apparatus 30. If it is determined that the passenger P leans against the seat supporting section 1c beyond the limit, a command is set so as not to supply a gate signal to, for example, switching device SW4 at the front passenger's seat when the relevant side of the automobile crashes into something, while if it is determined that the passenger P does not lean against the seat supporting section 1c beyond the limit, a command is set so as to supply a gate signal to the switching device SW4.

Figure 7:
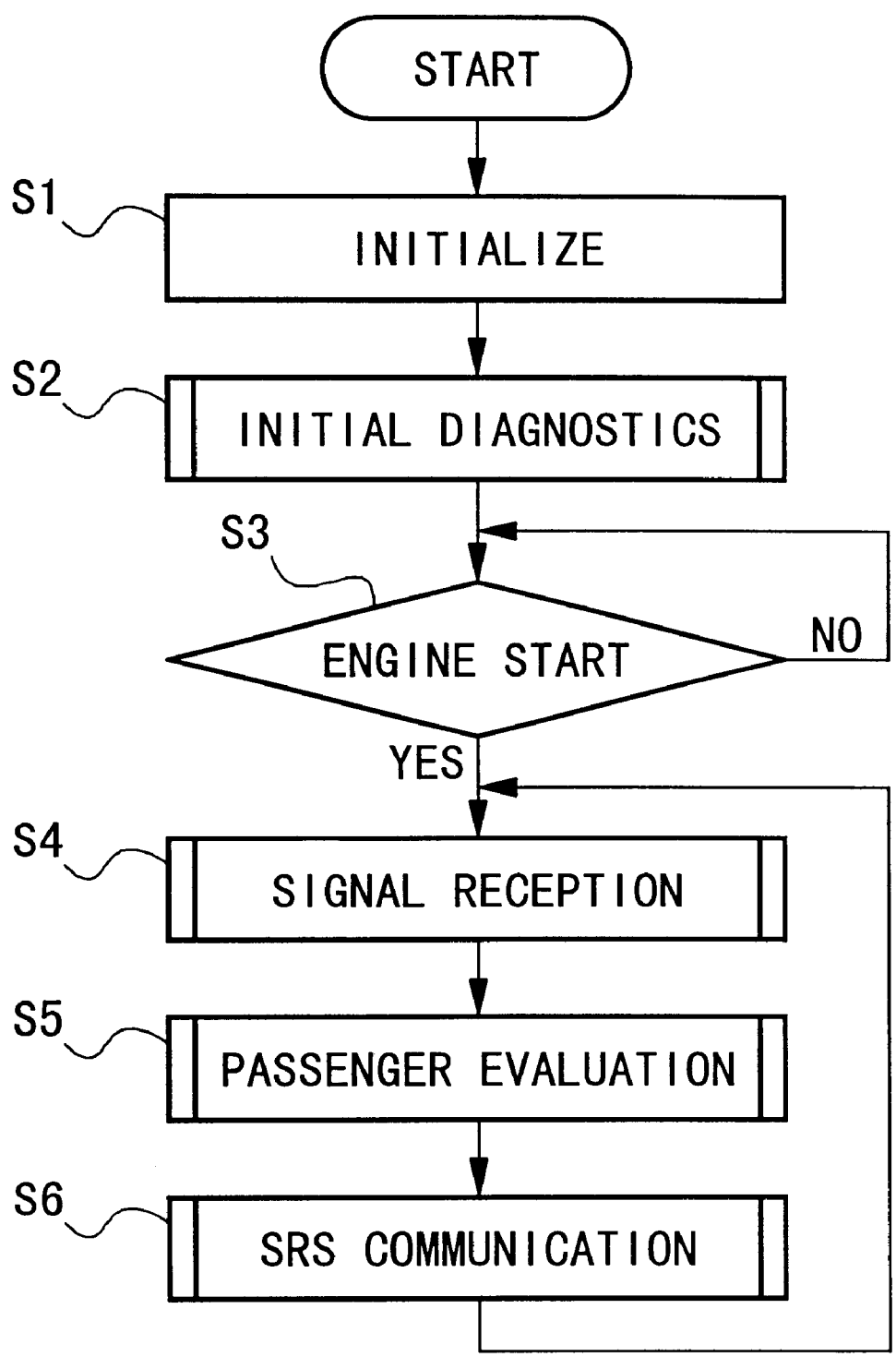
FIG. 7 is a flowchart of the passenger detecting operation in the passenger detection system.

The operational flow of the passenger detection system will be explained with reference to the flowcharts shown in FIGS. 7 to 11. First, as shown in FIG. 7, the ignition switch is turned on so that the process is in START. In step S1, the process (i.e., the program) is initialized, and proceeds to step S2. In step S2, initial diagnostics are performed for the communication system between the control circuit 20 and the airbag apparatus 30.

In step S3, it is examined whether the engine is operating, and if it is judged that the engine is operating, it proceeds to step S4. If it is determined that the engine is not operating, this determination step is repeated. In step S4, signal data (i.e., head position data) related to the current around a particular antenna electrode and signal data related to the seating condition of passenger P on seat 1, resulting from the application of a weak electric field on the particular antenna electrode of the antenna electrodes 4, are received.

In step S5, based on the received data, it is determined (i) presence/absence of the passenger in the seat, (ii) whether the passenger is an adult, and (iii) the seating condition of the passenger (i.e., the leaning condition against the seat supporting section 1c). In the following step S6, based on the results obtained by step S5, "SRS communication" is carried out between the control circuit 22 and the airbag apparatus (called SRS) 30. When step S6 is completed, it returns to step S4 and repeats the steps S4 to S6. Step S3 may be omitted.

Figure 8:
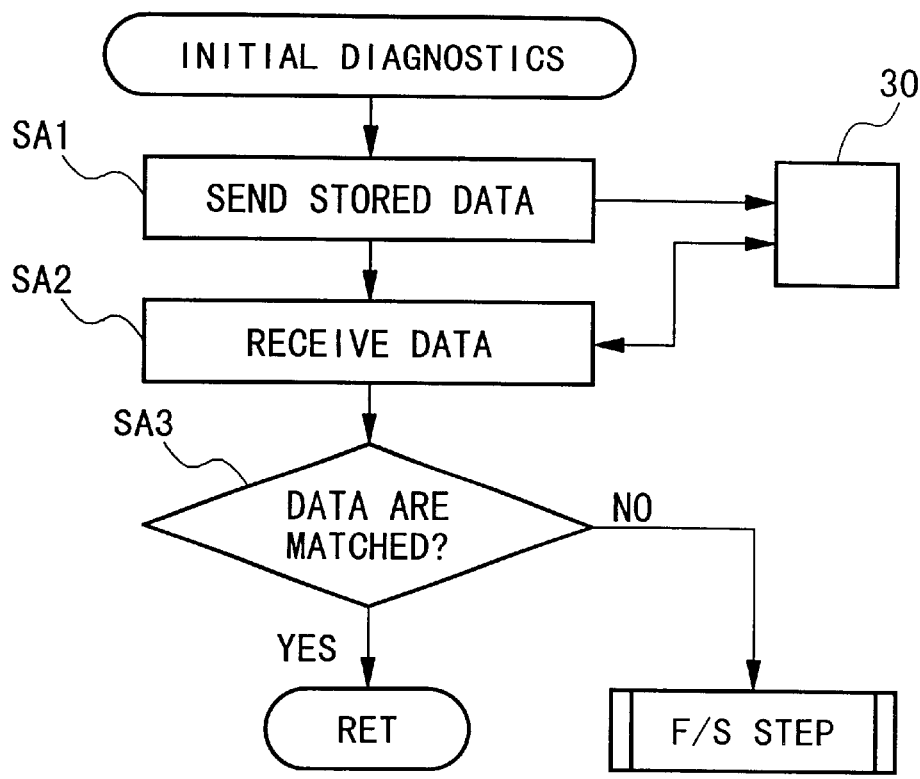
FIG. 8 is a flowchart of the process of initial diagnostics shown in FIG. 7.

Initial diagnostics in FIG. 7 are carried out as outlined in FIG. 8. First, in step SA1, stored data (here, fixed data) are sent from the control circuit 20 to the control circuit CC in the airbag circuit 30. In step SA2, transmission data are received by the control circuit 20 from the airbag apparatus 30. In step SA3, it is examined by control circuit 20 whether the received data from the airbag apparatus 30 match the data sent from the control circuit 20 to the airbag apparatus 30. If it is judged that the data are matched, the process is continued. If the data do not match, it is judged that problems exist in the communication system and a fail-safe process is carried out and an alert lamp or a warning lamp is turned on, for example.

The initial diagnostics may be carried out by sending stored or fixed data from the airbag apparatus 30 to the control circuit 20 which then sends corresponding data, so that matching process can be carried out in the control circuit CC in the airbag apparatus 30.

Figure 9:
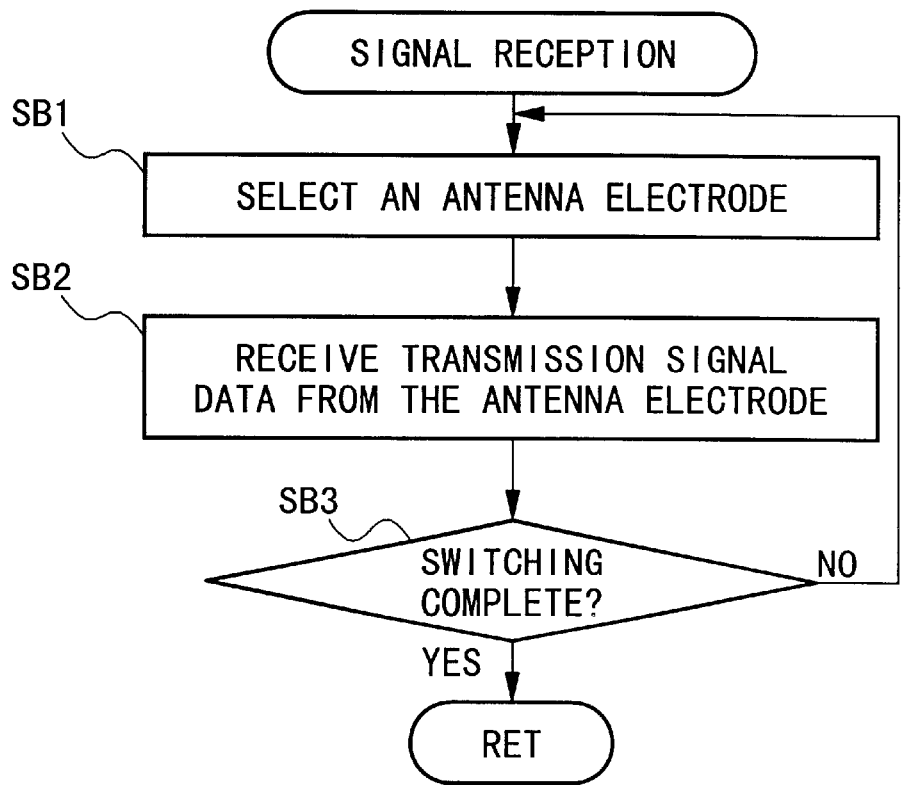
FIG. 9 is a flowchart of the signal reception process shown in FIG. 7.

The signal reception process in FIG. 7 is carried out as outlined in FIG. 9. First in step SB1, one switching device at one time is selected from the switching devices 18a to 18g by using the control signal from the control circuit 20, so that only the switching circuit 18a is closed, for example, to select an antenna electrode 4a. That is, one of the switching devices 18a to 18g is selectively closed in turn, such as 18a, 18b, 18c, . . . , so that a corresponding antenna electrode 4a4b, 4c, . . . , is selected in turn.

In step SB2, data of the transmission signal to the target antenna electrode is received in the control circuit 20. In step SB3, it is examined whether successive selection of antenna electrodes 4a to 4g by the successive actions of the switching devices 18a to 18g has been completed. If it is judged that the switching process has been completed, it proceeds to the passenger evaluation process. If it is judged that the switching process is incomplete, it returns to step SB1.

Figure 10:
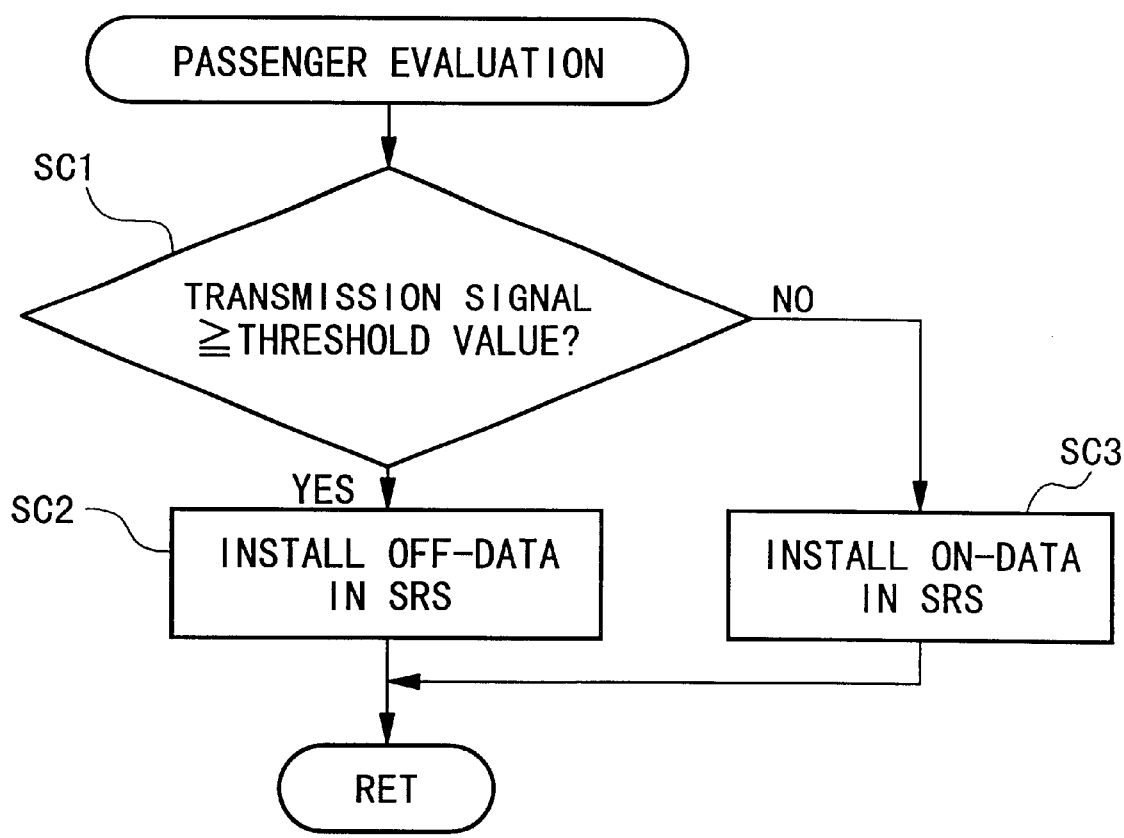
FIG. 10 is a flowchart of the passenger evaluation process shown in FIG. 7.

The passenger evaluation process in FIG. 7 is carried out as outlined in FIG. 10. First, in step SC1, the transmission signal data sent to the antenna electrode 4g and the threshold value data related to the leaning condition (against seat supporting section 1c) of the passenger, stored in advance in the control circuit 20, are compared so as to determine whether passenger P seated on seat 1 leans against the seat supporting section 1c. If the transmission signal data received by the antenna electrode 4g is equal to or greater than the threshold value, then it is determined that the passenger P leans against the seat supporting section 1c, and the process proceeds to step SC2. In step SC2, OFF-data for not deploying the side airbag unit are entered in the SRS, and the program continued.

Also in step SC1, if the transmission signal data sent to the antenna electrode 4g is smaller than the threshold value, it is determined that the passenger P does not lean against the seat supporting section 1c, and the process proceeds to step SC3. In step SC3, ON-data for deploying the side airbag unit are entered in the SRS, and the program connects to the SRS communication process.

The following operational flow may be added to the above passenger evaluation process: In the first step, signal data sent to the antenna electrodes 4a to 4f and the threshold value data for recognizing the shoulder line of the passenger are compared to extract an antenna electrode having transmission signal data which is equal to or greater than the relevant threshold value. In the second step, the head position is detected based on the position of the extracted antenna electrode, and the process proceeds to the third step.

In the third step, the detected head position is compared with the threshold value data (with respect to the head position) stored in advance in the control circuit 20 so as to determine whether the passenger seated on seat 1 is an adult. If the passenger is determined to be an adult P, then the process proceeds to the fourth step, where ON-data for deploying the main airbag unit in the airbag apparatus 30 is installed, and the process then proceeds to the SRS data communication flow. Here, the main airbag unit is provided at the dash board or the handle.

Also in the third step, if it is determined that the passenger seated on seat 1 is not an adult (that is, the passenger is a child), the process proceeds to the fifth step, where OFF-data for not deploying the main airbag unit in the airbag apparatus 30 is installed, and the program is continued.

Figure 11:
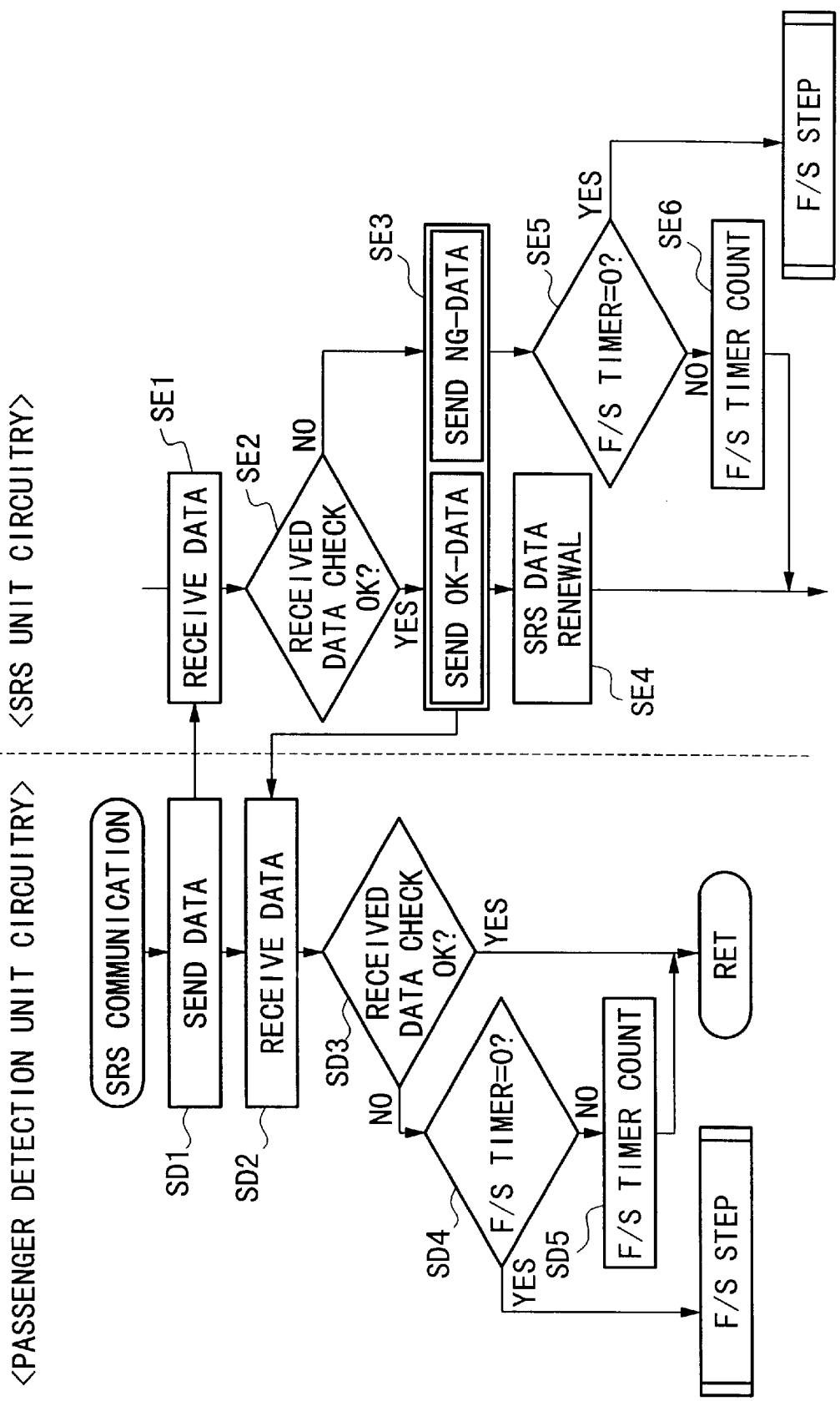
FIG. 11 is a flowchart of the SRS data communication process shown in FIG. 7.

The SRS data communication process in FIG. 7 is carried out as outlined in FIG. 11. First, in step SD1, ON-data for placing the airbag in the airbag apparatus 30 in the deployable state or OFF-data for placing the airbag in the non-deployable state and system check-data are sent from the passenger detection unit circuitry (i.e., control circuit 20) to the airbag apparatus circuitry (i.e., control circuit CC).

In step SD2, (system) OK-data or (system) NG-data in response to the ON-data or OFF-data and the system check-data from the airbag apparatus are received by the control circuit 20, and it proceeds to step SD3. In step SD3, it is judged whether the ON-/OFF-data and system check-data, which had been sent from the passenger detection side to the airbag apparatus side, are again returned from the airbag apparatus circuitry to the passenger detection side in the normal condition.

If it is judged to be normal (that is, there are no problems in the communication system), the process is continued. If there is a problem in the communication system circuit, it proceeds to step SD4, and it is examined whether the fail-safe timer is at zero. This detection process of communication system problems is, for example, programmed to repeat three times. Therefore, if it is judged that the fail-safe timer is zero, a fail-safe process is carried out, and an alert lamp is activated, for example. If it is judged that the fail-safe timer is not at zero, it proceeds to step SD5, and a fail-safe timer count is performed, and the process is continued.

On the other hand, in step SE1, the airbag apparatus circuitry (i.e., control circuit CC) receives ON-data for placing the airbag apparatus in the deployable state or OFF-data for placing the airbag apparatus in the non-deployable state and system check-data from the passenger detection unit circuitry (i.e., control circuit 20).

In step SE2, the received data are checked to examine whether or not they are normal. In either case, it proceeds to step SE3 for sending OK-data or NG-data and system check-data to the passenger detection unit circuitry.

If it is judged, in step SE2, that the communication system is normally operated, OK-data are sent in step SE3, and it proceeds to step SE4. In step SE4, the data on the airbag side is renewed in response to the OK-data, thereby enabling to place the airbag in the deployable state or non-deployable state.

If, in step SE2, it is judged that there is a problem in the communication system, NG-data are sent to the control circuit 20 in step SE3, and it proceeds to step SE5. In step SE5, it is examined whether the fail-safe timer is at zero. This detection process of circuit problems is programmed to repeat three times, for example. Therefore, if it is judged that the fail-safe timer is zero, a fail-safe process is carried out, and an alert lamp is activated, for example. If it is judged that the fail-safe timer is not at zero, it proceeds to step SE6, and a fail-safe timer count is performed, and the process is continued.

According to this embodiment, antenna electrode 4g is disposed at the seat supporting section 1c at the door side of seat 1, and the high frequency low voltage (HFLV) signal is applied to the antenna electrode 4g, thereby generating a weak electric field around this antenna electrode. Accordingly, a current corresponding to the seating condition of passenger P seated on seat 1, that is, the leaning condition with respect to the seat supporting section 1c, flows in the antenna electrode 4g.

As shown by the dotted lines in FIG. 6, if the passenger P leans against the seat supporting section 1c, the current level is higher, while if the passenger P is not in contact with the seat supporting section 1c as shown by the solid lines in FIG. 6 (that is, in the normal seating condition), the current level is lower. Accordingly, it is possible to detect the normal/abnormal posture of passenger P with respect to the seat supporting section 1c by referring to the above current level.

In addition, the side airbag unit in the airbag apparatus 30 is set to one of the deployable and non-deployable states according to the seating condition of the passenger seated on seat 1. If it is judged that passenger P leans against the seat supporting section 1c heavily, the side airbag of airbag apparatus 30 is set in the non-deployable state. Therefore, even if the relevant side of the automobile crashes into something, the side airbag does not deploy; thus, it is possible to prevent the passenger from suffering secondary damage which accompanies the deployment of the side airbag.

Furthermore, in the backrest section 1b of seat 1, a plurality of strip antenna electrodes 4 (4a to 4f) are provided over a wide range along the substantially horizontal direction of the section 1b, with a spacing to each other in the vertical direction. A high frequency low voltage (HFLV) signal is applied to each antenna electrode in turn, so that a weak electrical field is generated in the relevant antenna electrode. In this way, the antenna electrodes 4 (4a to 4f) facing body parts of the passenger such as the head, neck, shoulder, and back respectively get specific currents corresponding to the dielectric constants related to each body part. Therefore, the shoulder line can be extracted with reference to the above currents so as to detect the head position, thereby easily determining whether the passenger seated on the seat is an adult. Based on the above determination, it is possible to set the main airbag of the airbag apparatus 30 to the deployable or non-deployable state.

Also, the system cost can be lowered significantly by providing the system power source (used in control unit 10) from the single power source produced by the electric power circuit 22, and by producing an HFLV and approximately rectangular waveform with the use of only the positive power source in the oscillation circuit 11. In this case, the circuit arrangement of each unit as well as the electric power circuit 22 and the oscillation circuit 11 can be simplified.

Further, the amplitude control circuit 12 is used to maintain the amplitude of the voltage impressed on the antenna electrodes 4 (4a to 4g) approximately constant, so that the data related to the current detected by the electric current detection circuit 15 can be compared readily with the threshold value data relating to the head position and seating condition (i.e., the leaning condition against the seat supporting section) of the passenger, and the following judgment can also be performed easily. Therefore, detection with a high degree of accuracy and reliability can be realized.

It should be noted that the present invention is not limited to the above embodiment and other arrangements are possible. For example, the number of antenna electrodes provided in the seat supporting section and the backrest section may be adjusted suitably. The voltage generation means for generating an HFLV signal (which comprises an oscillation circuit) may also include an HFLV source to produce an approximately rectangular waveform by only using a positive electrical power source and by ON/OFF controlling a switching device based on clock signals in the control circuit. An output frequency other than 120 KHz may be chosen depending on the conditions inside the automobile, and the voltage may be selected outside the range of 5 to 12 volts. Also, the current detection circuit is not limited to the embodied example. In addition, the amplitude control circuit may be omitted depending on the precision of the system power source and expected performance level of the system.

What is claimed is:

1. A passenger detection system, comprising:

a seat on which a passenger is seated, having a seat supporting section;

an antenna electrode provided in the seat supporting section;

voltage generation means for generating a high-frequency and low-voltage signal which induces a weak electric field around the antenna electrode;

current detection means for detecting a current which flows according to the generated weak electric field;

a control circuit for detecting a leaning condition of the passenger against the seat supporting section, based on a signal output from the current detection means; and an airbag apparatus including a side airbag unit positioned close to a door, the apparatus having a function of deploying the side airbag unit when a collision occurs, and wherein data representing results detected by the control circuit is sent to the airbag apparatus so as to set the side airbag unit to one of the deployable and non-deployable states.

2. A passenger detection system as claimed in claim 1, wherein the voltage generation means comprises an oscillator for generating the high-frequency and low-voltage signal.

3. A passenger detection system as claimed in claim 1, wherein the voltage generation means generates the high-frequency and low-voltage signal having an approximately rectangular waveform by only using a positive power source and a signal from the control circuit.

4. A passenger detection system as claimed in claim 1, wherein the control circuit judges the suitability of the leaning condition of the passenger against the seat supporting section by comparing threshold value data, stored in advance in the control circuit, of an allowable limit with respect to the above leaning condition, with data representing the actual leaning state of the passenger against the seat supporting section obtained according to the current detected by the current detection means.

* * * * *